Figure 1:
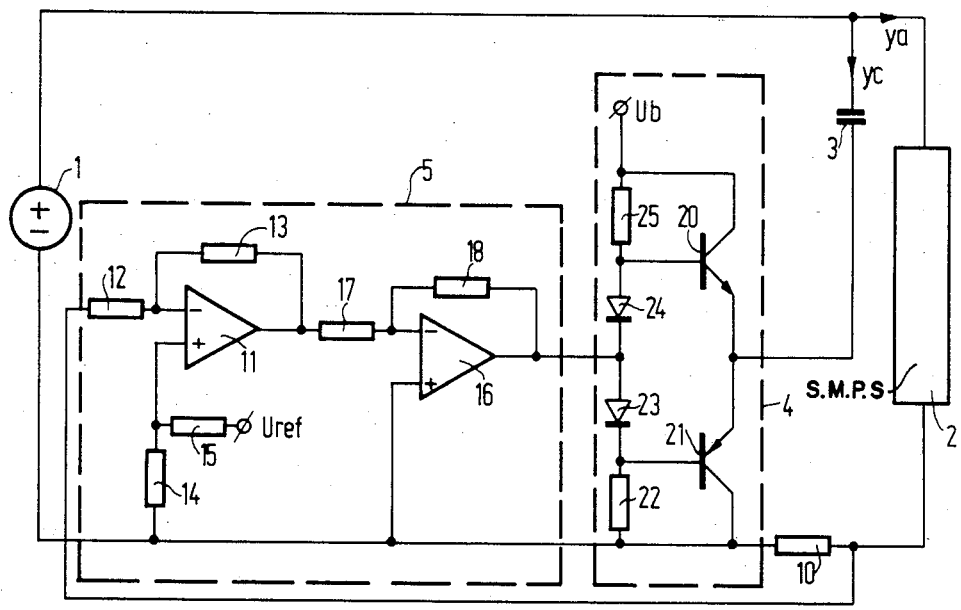

United States Patent [19]
Albach et al.

[11] Patent Number: 4,736,152
[45] Date of Patent: Apr. 5, 1988

[54] LOAD CURRENT INTERFERENCE REDUCING APPARATUS

[75] Inventors: Manfred Albach; Armin F. Wegener, both of Aachen, Fed. Rep. of Germany; Hubert C. Raets, Nieuwenhagen, Netherlands

[73] Assignee: U.S. Philips Corporation, New York, N.Y.

[21] Appl. No.: 35,579

[22] Filed: Apr. 7, 1987

[30] Foreign Application Priority Data

Apr. 12, 1986 [DE] Fed. Rep. of Germany ....... 3612378
Apr. 12, 1986 [DE] Fed. Rep. of Germany ....... 3612380

[51] Int. Cl.$^4$ .............................................. G05F 1/614
[52] U.S. Cl. .................... 323/233; 323/226; 323/269; 323/293
[58] Field of Search ............... 323/223, 224, 226, 233, 323/269, 273, 275, 293

[56] References Cited

U.S. PATENT DOCUMENTS 3,414,824  12/1968  Weidmann et al. ................ 307/520
4,016,481   4/1977  Bradley .............................. 323/226

FOREIGN PATENT DOCUMENTS 0059053  9/1982  European Pat. Off. .

Primary Examiner—Patrick R. Salce
Assistant Examiner—Jeffrey Sterrett
Attorney, Agent, or Firm—Bernard Franzblau

[57] ABSTRACT

A circuit arrangement for reducing an interference current produced by a load (2). The frequency of the interference current is considerably higher than the frequency of a supply voltage source (1) which is coupled to the load. In order to reduce the interference current, a compensation circuit is provided comprising at least one connection branch connected in the leads between the load and the supply voltage source and having each time a series-combination of a capacitor and a controlled signal source. Each signal source supplies a current dependent upon a control signal. The control signals are derived from the current flowing in a lead to the connection branch or away from it. The magnitude and the phase of the currents supplied by the signal sources are proportioned so that the interference current flows for the major part through the connection branch.

9 Claims, 3 Drawing Sheets

LOAD CURRENT INTERFERENCE REDUCING APPARATUS

The invention relates to a circuit arrangement comprising a load, which is coupled to a supply voltage source and produces in the current of the supply voltage source an interference current whose frequency is markedly higher than that of the current of the supply voltage source, and a compensation circuit, which is provided for reducing the interference current and comprises at least one connection branch with a capacitor arranged in the leads between the load and the supply voltage source.

Such a circuit arrangement is known from EP No. 0059053. A supply voltage source supplying an alternating voltage is coupled according to this Patent through a filter to a load, i.e. a switched mode power circuit part. The switched mode power circuit part produces, because of switching processes, an interference current whose frequency is markedly higher than that of the current of the supply voltage source and which reacts upon the supply voltage source. In order to suppress this interference current, the filter comprising a coil and a capacitor is provided. On the one hand the coil is connected to the supply voltage source and on the other hand to the load and to the capacitor connected parallel to the load. The use of a coil for reducing the interference current makes it difficult to reduce the size of the circuit arrangement.

The invention has for an object to construct a circuit arrangement of the kind mentioned in the opening paragraph in such a manner that a reduction of the interference current is achieved without the use of a coil.

According to the invention, this object is achieved in that a series arrangement of a capacitor and a controlled signal source is present in a connection branch, in that the signal source supplies a current dependent upon a control signal, in that the control signal is derived from the current flowing in a lead to the connection branch or away from this branch, and in that the magnitude and the phase of the current supplied by the signal source are proportioned so that the interference current flows for the major part through the connection branch.

The circuit arrangement according to the invention can comprise either one connection branch or several connection branches. By means of the controlled signal source in each connection branch of the compensation circuit, a current is passed into the capacitor connected to the signal source, which current corresponds to a great extent to the interference current measured in a lead. In each connection branch a part of the interference current is absorbed to a great extent so that only a small part of the interference current can reach the supply voltage source. The control signal, which is supplied to the respective signal source, depends upon the current in a lead. It is not necessary that this dependence be linear.

It should further be noted that U.S. Pat. No. 3,414,824 discloses an active low-pass filter which is arranged between a supply voltage source and a variable load, for example a telegraph. The variable load produces interference currents, which are compensated for by the active filter to a great extent. The active filter comprises a compensation circuit, an inductive element and a capacitive element. The interference currents produced by the load are eliminated to a great extent by the inductive element and the capacitive element. A further reduction is obtained by the compensation circuit. In this compensation circuit, a measuring resistor measures the interference current present, which is supplied through a voltage amplifier to a voltage-to-current converter. The voltage-to-current converter produces an opposite current, which counteracts the interference current present. A direct current is superimposed on this opposite current. The compensation circuit is supplied with energy by the supply voltage source. For this reason, a direct current is superimposed on the opposite current. As a result, besides the losses occurring in the inductive and capacitive elements, additional high losses are obtained. The supply voltage source can essentially be only a direct voltage source because it supplies the compensation circuit with energy.

In the circuit arrangement according to the invention, the d.c. component is suppressed by a capacitor in the connection branch. Moreover, at this capacitor the major part of the load decreases. The compensation circuit then produces a current opposite to the interference current without a d.c. component. Due to this construction, the losses in the compensation circuit are considerably smaller than according to U.S. Pat. No. 3,414,824. The compensation circuit is moreover not supplied with energy by the supply voltage source, but receives this energy from an external energy source. If the load is in the form of a combinatorial circuit part, the compensation circuit can receive the energy from the load.

If the circuit arrangement has only one connection branch, according to a further embodiment, it is ensured that the control signal is obtained from the voltage still present at a first measuring resistor, which is arranged in a lead between the load and the series arrangement of the capacitor and the signal source.

The voltage at the measuring resistor depends upon the current supplied by the supply voltage source and upon the interference current produced by the load. In order to obtain a signal only dependent upon the interference current, an amplifier circuit is provided having a first input which is supplied with the voltage still present at the first measuring resistor and having a second input supplied with a comparison voltage approximately corresponding to the variation with time of the current of the supply voltage source. This amplifier circuit supplies an output voltage representing the control signal. By means of a capacitor arranged between the measuring resistor and the controlled signal source, a signal independent of the current of the supply voltage source can also be obtained. The capacitance of the capacitor should then be chosen so that it suppresses the low-frequency signal produced by the current of the supply voltage source.

The comparison voltage can be obtained at a second measuring resistor which is arranged between the supply voltage source and the connection branch and at which the remaining interference current present, due to the incomplete compensation of the interference current, can also be measured.

In a further embodiment of the invention, the compensation circuit comprises at least two connection branches, with first measuring resistors arranged each time between the connection branches and between the load and a connection branch. The control signal for the respective signal source is obtained from the voltage still present at the respective first measuring resistor. In the first measuring resistors, the current of the supply voltage source with the interference current is measured.

The voltage at the first measuring resistors depends upon the current supplied by the supply voltage source and upon the interference current produced by the load. In order to obtain a signal dependent only upon the interference current, in the circuit arrangement according to the invention provided with at least two connection branches, with each signal source is associated with an amplifier circuit having a first input supplied with the voltage still present at the respective first measuring resistor. The amplifier circuit has a second input supplied with a comparison voltage which approximately corresponds to the variation with time of the current of the supply voltage source. The amplifier circuit produces an output voltage representing the control signal. Also in this further embodiment, instead of by means of the amplifier circuit, a signal independent of the current of the supply voltage source could be obtained by means of a capacitor arranged between the respective first measuring resistor and the respective controlled signal source. The capacitance of the capacitor should then be chosen so that it suppresses the low-frequency signal produced by the current of the supply voltage source.

The comparison voltage for the respective amplifier circuit can be obtained at second measuring resistors, which are each time arranged in a lead between the connection branches and between the supply voltage source and a connection branch and are each time connected to a connection branch and to a first measuring resistor, at which the other input voltage of the amplifier circuit is still present.

In another embodiment, each controlled signal source comprises a power amplifier having a complementary output stage.

The invention can be used in a circuit arrangement which comprises as a load a combinatorial circuit part.

Figure 2:
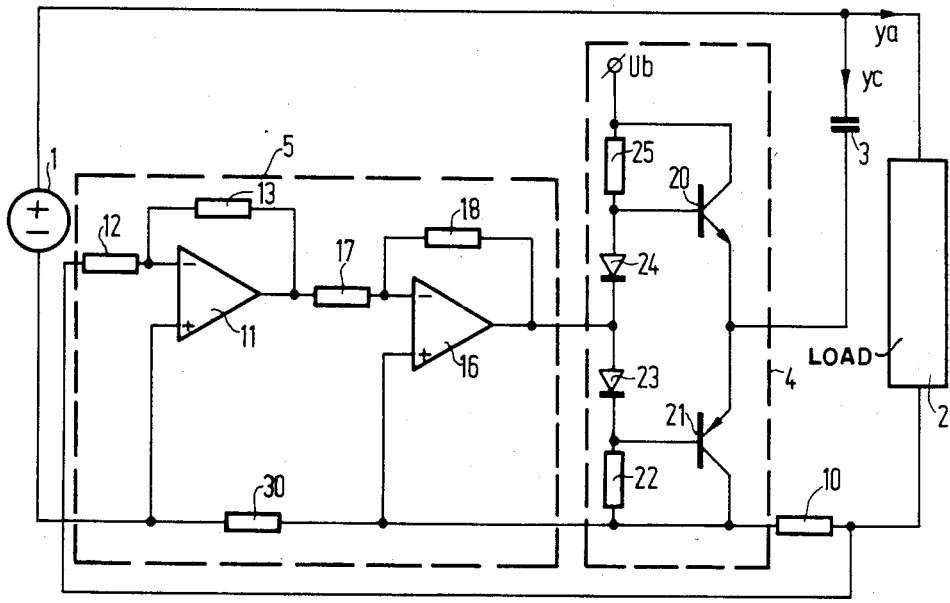
Figure 3:
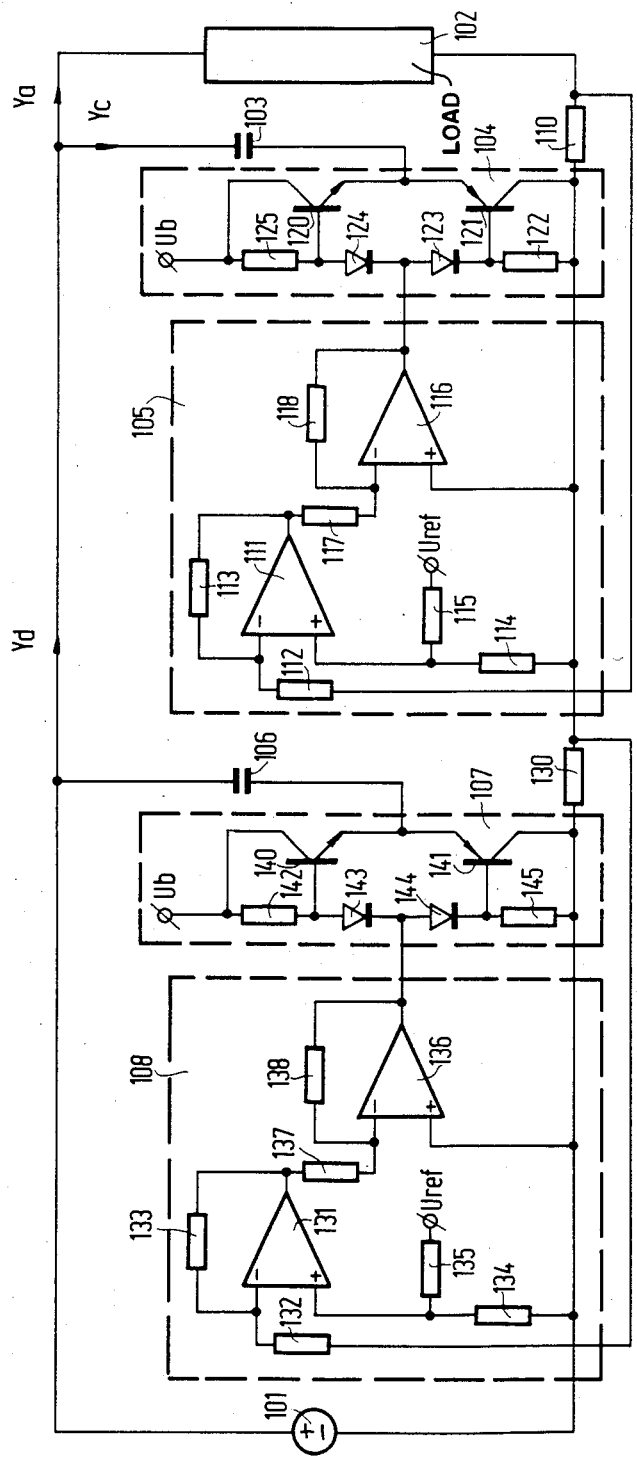
Figure 4:
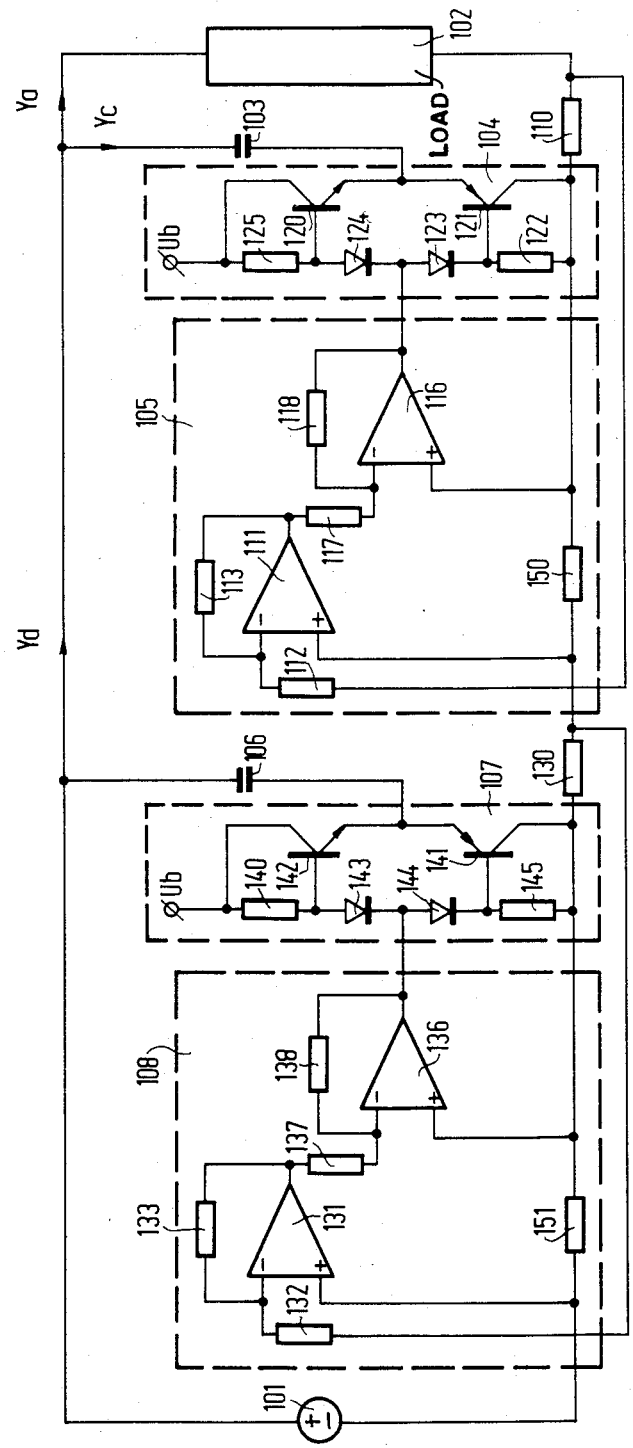

The invention will be described more fully with reference to the drawings, in which:

FIGS. 1 and 2 show two embodiments of the circuit arrangement according to the invention each having one connection branch, and FIGS. 3 and 4 show two embodiments of the circuit arrangement according to the invention each having two connection branches.

The first embodiment shown in FIG. 1 has a supply voltage source 1, which supplies, for example, a direct voltage of 50 V. A direct voltage has only a component at a frequency of zero. The supply voltage source 1 feeds through leads a load 2, which may be, for example, in the form of a forward voltage converter. Such switched mode power circuits are generally operated at switching frequencies of about 20 kHz to 200 kHz. These switching processes produce an interference current in the input current of the supply voltage source 1, whose frequency spectrum has components at the switching frequency and its harmonics.

In order to reduce this interference current, a compensation circuit is provided comprising a capacitor 3, a controlled signal source 4 and an amplifier circuit 5. The current Ya flowing through the load and containing the interference current leads to a voltage drop at a measuring resistor 10. The resistor 10 should preferably be chosen so that on the one hand it is as small as possible in order to limit the losses occurring in it, but on the other hand the voltage still present across it has a sufficiently high level for driving the amplifier circuit 5. The measuring resistor 10 is arranged between the negative reference point of the supply voltage source 1 and a connection point of the load 2. The amplifier circuit 5 is connected to the junction point between the load 2 and the measuring resistor 10. The amplifier circuit 5 comprises an amplifier 11, whose inverting input is connected through a resistor 12 to the aforementioned junction point and through a resistor 13 to its output. A resistor 14 is connected to the negative reference point of the supply voltage source 1 and a resistor 15 connected to a reference voltage source Uref. These resistors are connected to the non-inverting input of the amplifier 11. Furthermore, the amplifier circuit 5 comprises an amplifier 16, whose non-inverting input is connected to the negative reference point and whose inverting input is connected through a resistor 17 to the output of the amplifier 11 and through a resistor 18 to its output. The output of the amplifier 16 constitutes the output of the amplifier circuit 5.

The amplifier circuit 5 determines the difference between the comparison voltage, which is applied to the non-inverting input of the amplifier 11 and is an image of the voltage supplied by the supply voltage source, and the voltage still present at the first measuring resistor. The voltage at the output of the amplifier circuit 5 depends upon the interference current produced by the load 2. The resistors 12 to 15 and 17, 18 and the reference voltage Uref, which is an order of magnitude smaller than the direct voltage of the supply voltage source 1, can be chosen so that a d.c. voltage adaptation of the amplifier circuit and of the succeeding controlled signal source 4 is obtained.

The controlled signal source 4 comprises a power amplifier having a class AB complementary output stage. The complementary output stage comprises an NPN transistor 20 and a PNP transistor 21. The collector of the transistor 21 is connected to the negative reference point of the supply voltage source 1 and the base is connected on the one hand to a resistor 22 connected to the negative reference point and on the other hand to the cathode of a diode 23. The anode of the diode 23 is connected on the one hand to the output of the amplifier circuit 5 supplying the control voltage and on the other hand to the cathode of a diode 24. The base of the transistor 20 is connected to the junction point between the anode of the diode 24 and a resistor 25. A supply voltage Ub, which is an order of magnitude smaller than the direct voltage of the supply voltage source 1, is connected to the collector of the transistor 20 and to the other connection point of the resistor 25. The emitters of the two transistors 20 and 21 are connected through a junction point to the capacitor 3, which in turn is connected to the positive connection point of the supply voltage source 1.

The controlled signal source 4 forces, dependent upon the output voltage supplied by the amplifier circuit 5, a current Yc, which is approximately equal to the interference current, through the capacitor 3. Dependent upon the control voltage applied, either the transistor 20 or the transistor 21 is conducting. When the transistor 20 is conducting, the required current Yc is derived from the voltage source, which supplies the voltage Ub and is connected to the ground connection of the supply voltage source 1 (not shown here further). When the transistor 21 is conducting, the current Yc flows through it to the negative reference point. The capacitor 3 prevents the direct voltage of the controlled signal source from acting upon the supply voltage source 1 and upon the load 2. The difference between the voltage at the load 2 and the voltage at the output of the signal source 4, which is generally an order of magnitude smaller than the voltage at the load 2, is still present at the capacitor 3.

Because of the non-ideal elements and the non-linearity of the signal source 4, complete compensation of the interference current is not attained.

In a further embodiment shown in FIG. 2, a possibility is illustrated of attaining a further reduction of the interference current. The circuit elements having the same functions as in FIG. 1 are designated by the same reference symbols. A difference in the embodiment of FIG. 2 with respect to the embodiment shown in FIG. 1 resides only in the amplifier circuit 5. The resistor 12 is connected to the junction point between the measuring resistor 10 and the load 2 and this resistor is connected on the other hand to the inverting input of the amplifier 11. The inverting input is connected through the resistor 13 to its output. The non-inverting input is connected in this embodiment to the negative connection of the supply voltage source 1. A voltage is applied to the non-inverting input of the amplifier 11 and this voltage is still present across a second measuring resistor 30, which is arranged between the negative connection of the supply voltage source 1 and the first measuring resistor 10. The negative connection of the voltage source Ub, from which both the signal source 4 and the amplifiers 11 and 16 are supplied, is connected to the junction point between the two measuring resistors 10 and 30. The further construction of the amplifier circuit 5 is identical to the construction according to the embodiment of FIG. 1. According to the embodiment of FIG. 2, the difference between the voltage at the measuring resistor 10 and the voltage at the measuring resistor 30 is formed in the amplifier circuit 5.

In a practical construction, a switched mode power circuit was used, which produces a triangular interreference current. It has been found that the first harmonic of the interference current lying at 20 kHz was reduced according to the embodiment of FIG. 1 by 30 dB, while in the embodiment of FIG. 2 the first harmonic could be reduced by 50 dB.

In the embodiments of FIGS. 3 and 4, two connection branches are used. The embodiment of FIG. 3 has a supply voltage source 101, for example supplying a direct voltage of 50 V. The direct voltage supplied by the supply voltage source 101 has only components at a frequency of zero. The supply voltage source 101 feeds through leads a load 102, which may be, for example, a switched mode power circuit in the form of a forward voltage converter. Such switched mode power circuits are generally operated at switching frequencies of about 20 kHz to 200 kHz. These switching processes produce an interference current in the input current of the supply voltage source 101 whose frequency spectrum has components at the switching frequency and the harmonics thereof.

For reduction of this interference current, a compensation circuit is provided comprising a first connection branch having a capacitor 103, a controlled signal source 104 and an amplifier circuit 105 as well as a second connection branch having a capacitor 106, a controlled signal source 107 and an amplifier circuit 108. The current Ya flowing through the load and containing the interference current produces a voltage drop at a measuring resistor 110. The measuring resistor 110 should preferably be chosen so that on the one hand it is as small as possible for limiting the losses occurring in it, but on the other hand the voltage still present across it has a sufficiently high level for driving the amplifier circuit 105. This resistor 110 is connected on the one hand to a connection point of the load 102 and on the other hand to a second measuring resistor 130 connected to the negative connection point of the supply voltage source 101. The junction point between the two measuring resistors 110 and 130 is designated hereinafter as the reference point of the first connection branch.

The amplifier circuit 105 is connected to the junction point between the load 102 and the measuring resistor 110. The amplifier circuit 105 comprises an amplifier 111, whose inverting input is connected through a resistor 112 to the aforementioned junction point and through a resistor 113 to its output. A resistor 114 is connected to the reference point of the first connection branch and a resistor 115 connected to a reference voltage source Uref. These resistors are connected to the non-inverting input of the amplifier 111. Furthermore, an amplifier 116 is included in the amplifier circuit 105 and the non-inverting input of ths amplifier is connected to the reference point of the first connection branch, while its inverting input is connected through a resistor 117 to the output of the amplifier 111 and through a resistor 118 to its output. The output of the amplifier 116 constitutes the output of the amplifier circuit 105.

The amplifier circuit 105 forms the difference between the voltage at the measuring resistor 110 and a comparison voltage applied to the non-inverting input of the amplifier 111 and which is a reflection of the direct voltage supplied by the supply voltage source 101. The voltage at the output of the amplifier circuit 105 depends upon the interference current produced by the load 102. The resistors 112 to 115 and 117, 118 and the reference voltage Uref, which is an order of magnitude smaller than the direct voltage of the supply voltage source 101, can be chosen so that a d.c. voltage adaptation of the amplifier circuit 105 and of the succeeding controlled signal source 104 is obtained.

The controlled signal source 104 comprises a power amplifier having a class AB complementary output stage. The complementary output stage comprises an NPN transistor 120 and a PNP transistor 121. The collector of the transistor 121 is connected to the reference point of the first connection branch and the base is connected on the one hand to a resistor 122 connected to the reference point of the first connection branch and on the other hand to the cathode of a diode 123. The anode of the diode 123 is connected on the one hand to the output of the amplifier 105 supplying the control voltage and on the other hand to the cathode of a diode 124. The base of the transistor 120 is connected to the junction point between the anode of the diode 124 and a resistor 125. A supply voltage Ub, which is an order of magnitude smaller than the direct voltage of the supply voltage source 101, is applied to the collector of the transistor 120 and to the other connection point of the resistor 125. The emitters of the two transistors 120 and 121 are connected through a junction point to the capacitor 103, which in turn is connected to the positive connection point of the supply voltage source 101.

The controlled signal source 104 forces, depending upon the output voltage supplied by the amplifier circuit 105, a current Yc, which is approximately equal to the interference current, through the capacitor 103. Depending upon the control voltage applied, either the transistor 120 or the transistor 121 is conducting. When the transistor 120 is conducting, the required current Yc is derived from the voltage source supplying the voltage Ub and connected to the negative connection point of the supply voltage source 101 (not shown here further). When the transistor 121 is conducting, the current Yc flows through it to the reference point of the first connection branch. The capacitor 103 prevents the direct voltage of the controlled signal source from acting upon the supply voltage source 101 and the load. At the capacitor 103, the voltage difference between the voltage at the load 102 and the voltage at the output of the signal source 104 is still present, which is generally an order of magnitude smaller than the voltage at the load 102.

Because of the non-ideal elements and the non-linearity of the signal source 104, complete compensation of the interference current is not attained. A further reduction of the interference current can be achieved by means of a second connection branch. The interference current which is not absorbed through the capacitor 103 is to be referred to hereinafter as partial interference current. This partial interference current produces a voltage drop in the measuring resistor 130. The measuring resistor 130 should be chosen according to the same criteria as the measuring resistor 110. The amplifier circuit 108 is connected to the negative reference point of the first connection branch. The amplifier circuit 108 comprises an amplifier 131, whose inverting input is connected through a resistor 132 to the negative reference point of the first connection branch and through a resistor 133 to its output. A resistor 134 is connected to the negative reference point of the supply voltage source 101 and a resistor 135 connected to the reference voltage source Uref. These resistors are connected to the non-inverting input of the amplifier 131. Furthermore, the amplifier circuit 108 includes an amplifier 136, whose non-inverting input is connected to the negative connection of the supply voltage source 101 and whose inverting input is connected through a resistor 137 to the output of the amplifier 131 and through a resistor 138 to its output. The output of the amplifier circuit 108 is at the same time the output of the amplifier 136.

The amplifier circuit 108 controls a controlled signal source 107, which comprises a power amplifier having a class AB complementary output stage. The complementary output stage comprises an NPN transistor 140 and a PNP transistor 141. The collector of the transistor 140 is connected to the supply voltage Ub and is coupled to a resistor 142, whose other connection point is connected to the base of the transistor 140 and to the anode of a diode 143. The cathode of the diode 143, the anode of a diode 144 and the output of the amplifier 136 are connected to a common junction point. The cathode of the diode 144 is connected to a resistor 145 connected to the negative connection of the supply voltage source 101 and to the base of the transistor 141. The collector of the transistor 141 is connected to the negative connection of the supply voltage source 101. The interconnected emitters of the transistors 140 and 141 are connected through the capacitor 106 to the positive connection point of the supply voltage source 101.

The operation of the second connection branch, which comprises the amplifier circuit 108, the controlled signal source 107 and the capacitor 106, is the same as that described above for the first connection branch. The partial interference current is absorbed to a great extent through the capacitor 106. A further reduction of the remaining interference current can be attained with one or more further connection branches.

By a further measure, which does not require a further connection branch, the remaining interference current can be further reduced. This possibility is shown in a further embodiment, which is illustrated in FIG. 4. The circuit elements having the same functions as in FIG. 3 are designated by the same reference symbols. A difference in the embodiment shown in FIG. 4 with respect to the embodiment shown in FIG. 3 resides only in the amplifier circuits 105 and 108. The resistor 12 is connected to the junction point of the measuring resistor 110 and of the load 102 and this resistor 112 is connected on the other hand to the inverting input of the amplifier 111. The inverting input is connected through the resistor 113 to its output. The non-inverting input is connected in this embodiment to the junction point between the measuring resistor 130 and a further measuring resistor 150, which is connected on the other hand to the connection point of the resistor 110 remote from the load 102. The further construction of the amplifier circuit 105 is identical to the construction according to the embodiment shown in FIG. 3. A voltage is applied to the non-inverting input of the amplifier 111 and this voltage is still present at the measuring resistor 150. This voltage is proportional to the current flowing through this resistor 150. According to the embodiment shown in FIG. 4, in the amplifier circuit 105 the voltage at the measuring resistor 150, which is proportional to the current of the voltage source 101 and a small partial interference current, is used on the one hand to produce the comparison voltage and on the other hand to further reduce the partial interference current.

In the amplifier circuit 108, the resistor 132 is connected to the junction point between the two resistors 130 and 150. The inverting input of the amplifier 131 is connected on the one hand to resistor 132 and to the resistor 133, which in turn is connected to the output of the amplifier 131. The non-inverting input of the amplifier 131 is connected to the negative connection point of the supply voltage source 101. A measuring resistor 151 is connected between the negative connection point of the supply voltage source 101 and the left hand connection point of the resistor 130. The further construction of the amplifier circuit 108 is identical to the construction according to the embodiment shown in FIG. 3. The voltage still present at the measuring resistor 151 is proportional to the current flowing through this resistor. The resistor 151 has the same function as the resistor 150. The resistor 130 may be dispensed with if the resistor 132 is not connected, as shown in FIG. 4, between the two resistors 130 and 150, but is connected between the resistors 150 and 110.

In a practical construction, a switched mode power circuit was used which produces a triangular interference current. It has been found that the first harmonic of the interference current lying at 20 kHz is reduced according to the embodiment of FIG. 4 by more than 50 dB.

The circuit arrangement according to the invention is not limited to the use of a supply voltage source supplying a direct voltage, but may also be used when a supply voltage source supplies an alternating voltage. The components of the alternating voltage source must lie, however, at considerably lower frequencies than the components of the interference current.

What is claimed is:

1. A circuit arrangement comprising a load coupled via leads to a supply voltage source wherein the load produces in the current of the supply voltage source an interference current whose frequency is considerably higher than that of the current of the supply voltage source, a compensation circuit for reducing the interference current and which comprises at least one connection branch with a capacitor connected between said leads, characterized in that the connection branch includes a series arrangement of the capacitor and a controlled signal source wherein the signal source supplies a current dependent upon a control signal; in that the control signal is derived from a current which flows in a lead to the connection branch or away from it; and in that the magnitude and the phase of the current supplied by the signal source are proportioned so that the interference current flows for the major part through the connection branch.

2. A circuit arrangement as claimed in claim 1, characterized in that the control signal is obtained from the voltage still present at a first measuring resistor connected in a lead between the load and the series arrangement of the capacitor and the signal source.

3. A circuit arrangement as claimed in claim 2 further comprising an amplifier circuit having a first input supplied with the voltage still present at the first measuring resistor and a second input supplied with a comparison voltage which approximately corresponds to the variation with time of the current of the supply voltage source, and wherein the amplifier circuit produces an output voltage representing the control signal.

4. A circuit arrangement as claimed in claim 3, characterized in that a second measuring resistor for deriving the comparison voltage, is connected between the supply voltage source and the connection branch.

5. A circuit arrangement as claimed in claim 1, characterized in that the compensation circuit comprises at least two connection branches; in that first measuring resistors are connected respectively in a lead between the connection branches and between the load and a connection branch; and in that the control signal for the respective signal sources is obtained from the voltage still present at the respective first measuring resistors.

6. A circuit arrangement as claimed in claim 5, characterized in that each signal source is coupled to an amplifier circuit having a first input supplied with the voltage still present at the respective first measuring resistor and a second input supplied with a comparison voltage which approximately corresponds to the variation with time of the current of the supply voltage source, and wherein each amplifier circuit produces an output voltage representing the control signal.

7. A circuit arrangement as claimed in claim 6, characterized in that the comparison voltage for the respective amplifier circuit is obtained at respective second measuring resistors respectively connected in a lead between the connection branches and between the supply voltage source and a connection branch respectively connected to a connection branch and to a first measuring resistor, at which the other input voltage of the amplifier circuit is still present.

8. A circuit arrangement as claimed in claim 1 wherein a controlled signal source comprises a power amplifier having a complementary output stage.

9. A circuit arrangement as claimed in claim 1 wherein the load comprises a switched mode power circuit.

* * * * *